United States Patent [19]

Kazaks

[11] Patent Number: 5,600,098
[45] Date of Patent: Feb. 4, 1997

[54] ELECTRONIC CABLE ORGANIZER

[76] Inventor: Alexander Kazaks, 409 N. 24th St., LaCrosse, Wis. 54601

[21] Appl. No.: 279,528

[22] Filed: Jul. 25, 1994

[51] Int. Cl.$^6$ .................................................. H02G 3/04
[52] U.S. Cl. .......................... 174/135; D8/356; D13/156
[58] Field of Search ........................... 174/135, 102 R, 174/91, 121 A, 136; 428/16, 21, 919; D8/356; D13/137, 138, 140, 154, 155, 156; D3/300, 301; D9/310, 306; D19/89; D21/148; D24/168

[56] References Cited

U.S. PATENT DOCUMENTS

| | | | |
|---|---|---|---|
| 2,585,054 | 2/1952 | Stachura | 174/36 |
| 2,960,561 | 11/1960 | Plummer | 174/68.3 X |
| 3,038,558 | 6/1962 | Plummer | 174/136 X |
| 3,092,530 | 6/1963 | Plummer | 174/68.3 X |
| 3,459,870 | 8/1969 | Plummer | 174/5 R X |
| 3,568,308 | 3/1971 | Plaskon | 174/135 X |
| 4,018,983 | 4/1977 | Pedlow | 174/135 |
| 4,534,354 | 8/1985 | Bonner, Jr. et al. | 128/402 |
| 4,977,011 | 12/1990 | Smith | 428/152 |
| 5,130,496 | 7/1992 | Jenkins | 174/135 |
| 5,178,163 | 1/1993 | Yewer, Jr. | 128/876 |
| 5,377,360 | 1/1995 | Fleitman | 2/181 |
| 5,395,399 | 3/1995 | Rosenwald | 107/108 |
| 5,397,298 | 3/1995 | Mazza et al. | 602/75 |

*Primary Examiner*—Kristine L. Kincaid
*Assistant Examiner*—Paramita Ghosh
*Attorney, Agent, or Firm*—Joel D. Skinner, Jr.

[57] ABSTRACT

An organizer for securing a plurality of insulated electrical conductors such as PC interconnect and power cables. The organizer comprises a body constructed of a single piece of thin, flat, flexible fabric having a rectangular configuration with first and second end edges and first and second side edges. A fastening mechanism is attached to the side edges to bring them together as the body is wrapped around the cables. The fastening mechanism is preferably a zipper, straps or a hook and loop type fastener. One of more access apertures may be disposed in the body.

3 Claims, 5 Drawing Sheets

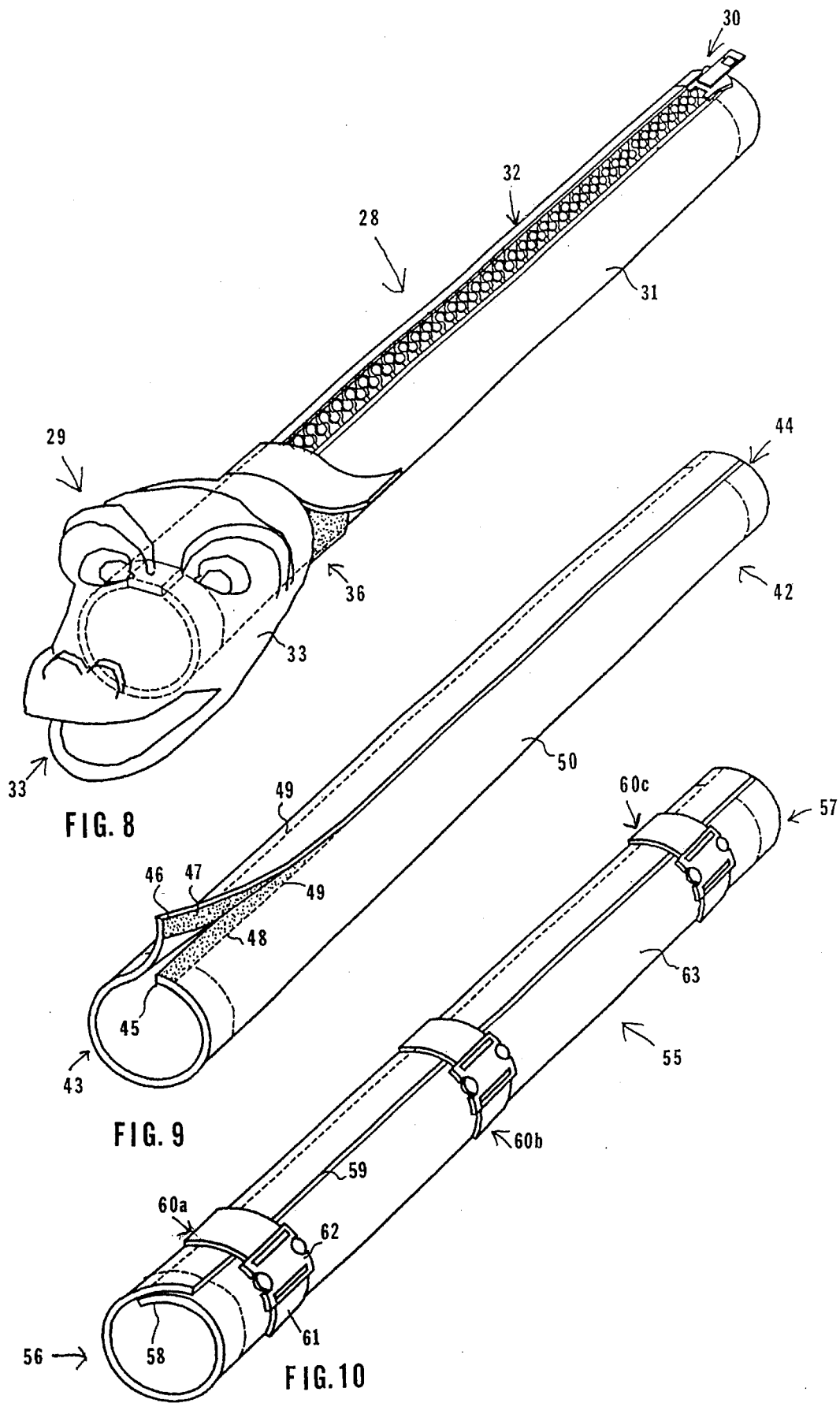

5,600,098

ELECTRONIC CABLE ORGANIZER

BACKGROUND OF THE INVENTION

1. Field of the Invention

This invention relates to retaining apparatus, and particularly to a retaining structure for electronic and other cables and wires. The retainer of this invention is particularly useful for organizing personal computer (PC) and PC accessory interconnect cables and power cords.

2. Background Information

In the past, various devices and/or methods have been used and/or proposed to retain cables, cords and wires, particularly electronic structures. However, these devices and methods have significant limitations and shortcomings. Prior art structures are complex, cumbersome to use, and expensive. Moreover, none are suitable for securing and organizing interconnect and other cables and cords typically found on PCs and PC peripherals. Recently, an acute need has arisen for such a device due to the rapid expansion in the numbers and use of PCs.

Despite the need in the art for a cable retaining mechanism which overcomes the shortcomings and limitations of the prior art, none insofar as is known has been developed or proposed. Accordingly, it is an object of the present invention to provide a retainer for securing and organizing interconnect and other cables and cords for PCs and PC peripherals. Another object of this invention is to provide a cable organizer which is simple to construct and use, inexpensive, and which is useable for a variety of equipment and cable types, sizes and installations. A final object of this invention is to provide a cable organizer which overcomes the limitations and shortcomings of the prior art.

SUMMARY OF THE INVENTION

The apparatus of the present invention provides an apparatus for securing a plurality of elongated flexible structures, comprising:

(a) a body constructed of a single piece of thin, flat, flexible material having a quadrilateral configuration with first and second end edges and first and second side edges; and (b) means, disposed along the first and second side edges, to releasably join the side edges together.

In a preferred embodiment the invention provides an apparatus for securing a plurality of elongated flexible insulated electrical conductors such as PC interconnect and power cables, comprising:

(a) a body constructed of a single piece of thin, flat, flexible fabric material having a rectangular configuration with first and second reinforced end edges and first and second side edges;

(b) means, disposed along the first and second side edges, to releasably join the side edges together;

(c) at least one ingress/egress aperture disposed at a predetermined point in the body; and (d) means to close the ingress/egress aperture.

The benefits of this invention will become clear from the following description by reference to the drawings.

BRIEF DESCRIPTION OF THE DRAWINGS

FIG. 8 is a perspective view of an alternative embodiment of the organizer.

FIG. 9 is a perspective view of another embodiment of the organizer.

FIG. 10 is a perspective view of another embodiment of the organizer.

DESCRIPTION OF THE PREFERRED EMBODIMENT

The apparatus of the present invention is for organizing and securing electronic and other cabling, particularly that used in PCs.

Figure 1:
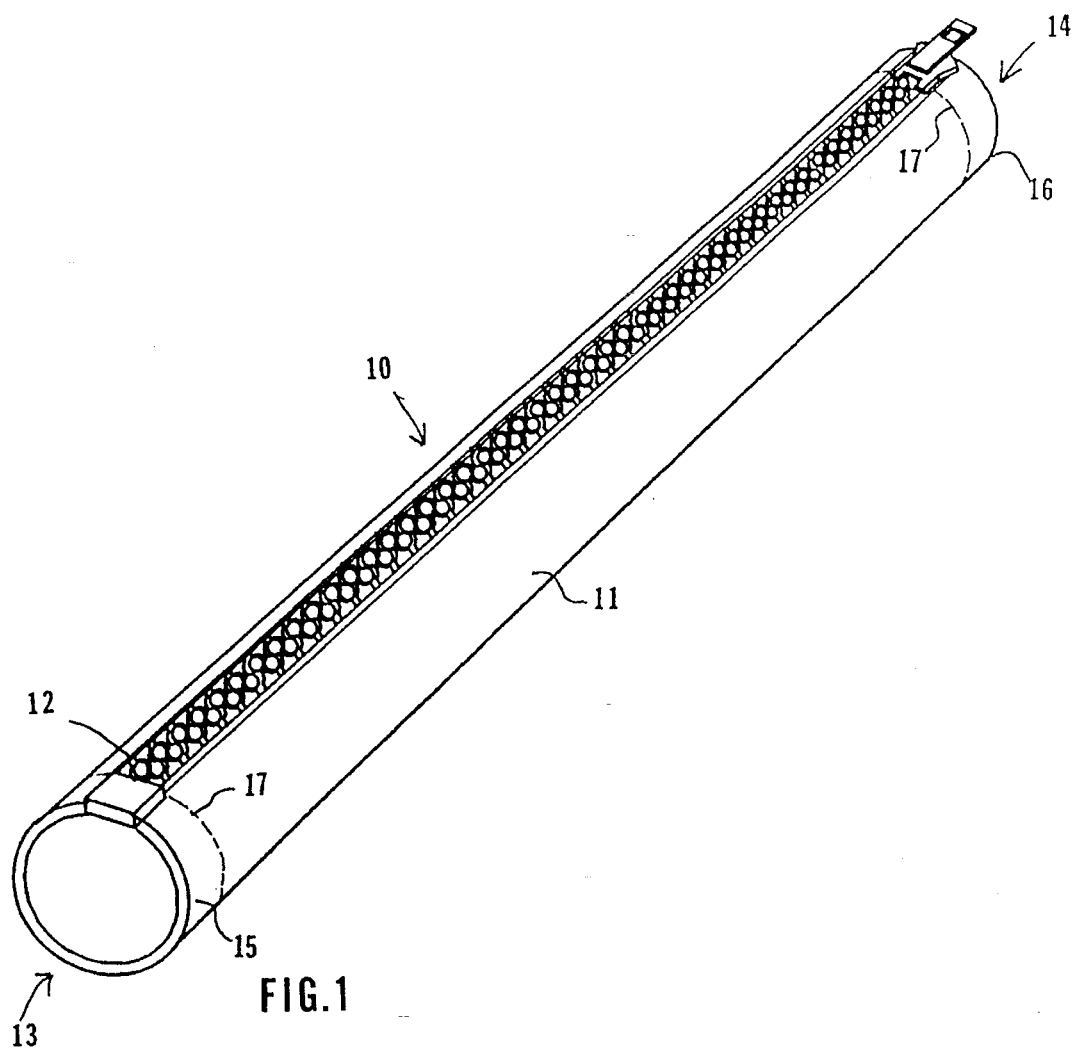
FIG. 1 is a perspective view of the cable organizer of the present invention.
Figure 2:
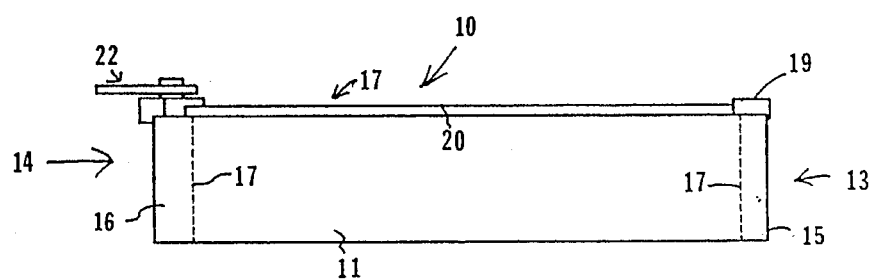
FIG. 2 is a side view of the organizer.
Figure 4:
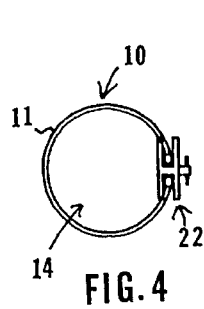
FIG. 4 is an end view of the organizer.
Figure 3:
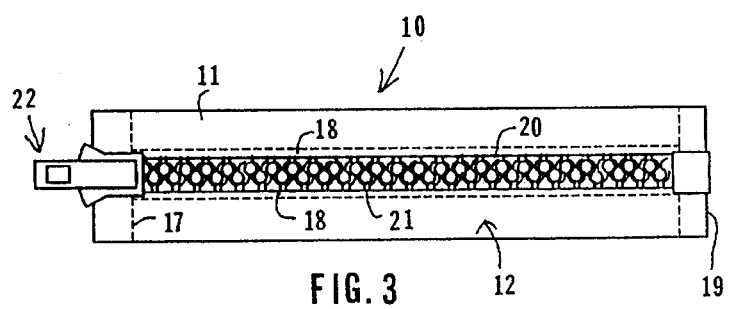
FIG. 3 is a top view of the organizer.
Figure 5:
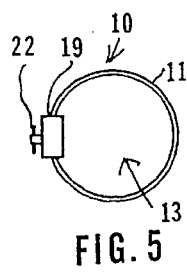
FIG. 5 is an opposite end view of the organizer.
Figure 6:
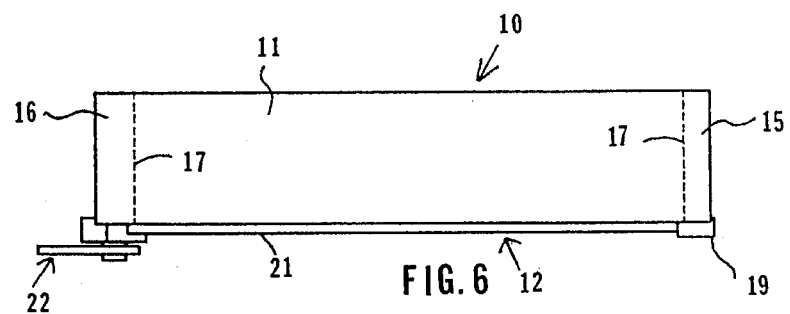
FIG. 6 is an opposite side view of the organizer.
Figure 7:
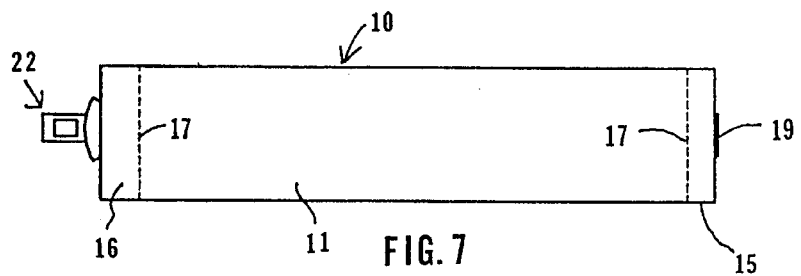
FIG. 7 is a bottom view of the organizer.
Figure 11:
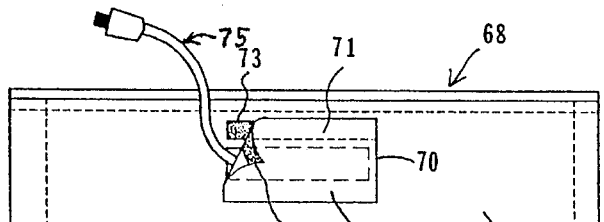
FIG. 11 is a side view of another embodiment of the organizer.
Figure 13:
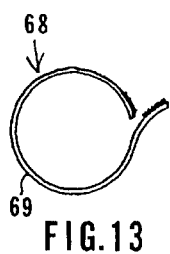
FIG. 13 is an opposite side view of the organizer.
Figure 12:
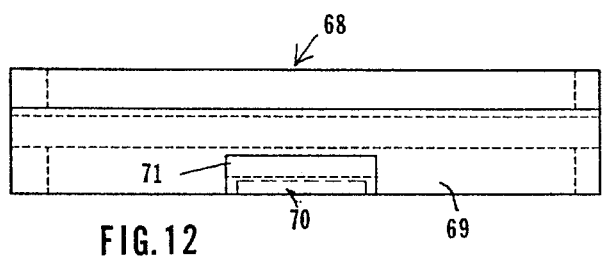
FIG. 12 is a top view of the organizer of FIG. 11.
Figure 14:
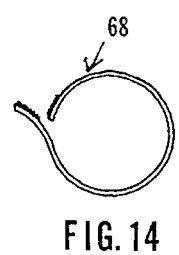
FIG. 14 is a bottom view of the organizer.
Figure 15:
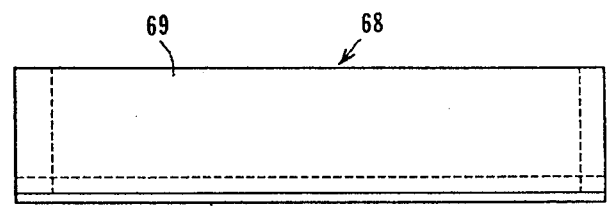
FIG. 15 is an end view of the organizer.
Figure 16:
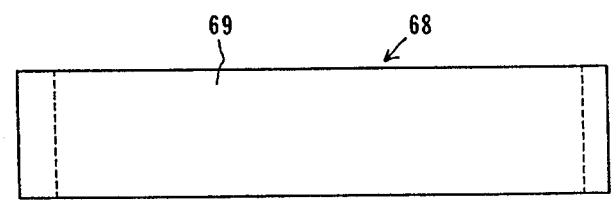
FIG. 16 is an opposite end view.

Referring to FIG. 1, the organizer 10 is shown zipped expanded, and having an elongated tubular or cylindrical configuration with proximal and distal ends 13 and 14. The length and expanded diameter of the organizer 10 are variable to suit the specific cabling application. A length of approximately 36 inches (91.4 cm.) and expanded diameter of 2 inches (5.0 cm) has been found to be optimal for use with PC cabling. The organizer 10 minimizes tangling of cords, dust and spider web build up, and accidental scraping or pulling by other equipment or by passersby. Additionally, the organizer 10 assists in creating a clean, aesthetically pleasing look and environment.

Referring also to FIGS. 2–7, the organizer 10 has a unitary, flexible body 11 which is constructed of lycra or a similar thin, flexible, light weight woven fabric. Lycra is preferred because it has the ability to stretch to accommodate additional cabling when full. Other sheet-like materials such as non-woven materials and plastics may also be used. The body 11 material is preferably formed in a single flat sheet, but may alternatively have pleats (not shown) that allow for expansion of the body 11. Additionally, although the body 11 is shown to be a single layer, a lined or double layer body may also be utilized. In an operative orientation the elongated sides are attached or mated to form a cylindrical unit around cabling via a zipper 12. As is well known, the zipper 12 is formed of first and second members 20 and 21 which are each connected along the length of the opposing body 11 sides by stitching 18, and are further connected at a base end 19. The first and second members 20 and 21 are drawn together by a handle member 22. The body 11 has reinforced portions 15 and 16 at each end 13 and 14 where cabling 104 (shown in FIG. 19) enters and exists. The reinforced portions 15 and 16 resist wear due to abrasion an stretching. The reinforced portions 15 and 16 are preferably formed by folding over the body material and securing it via stitching 17. An elastic strap or closure (not shown) may be incorporated in the reinforced ends 15 and 16 to seal the interior cavity of the organizer 10.

Figure 19:
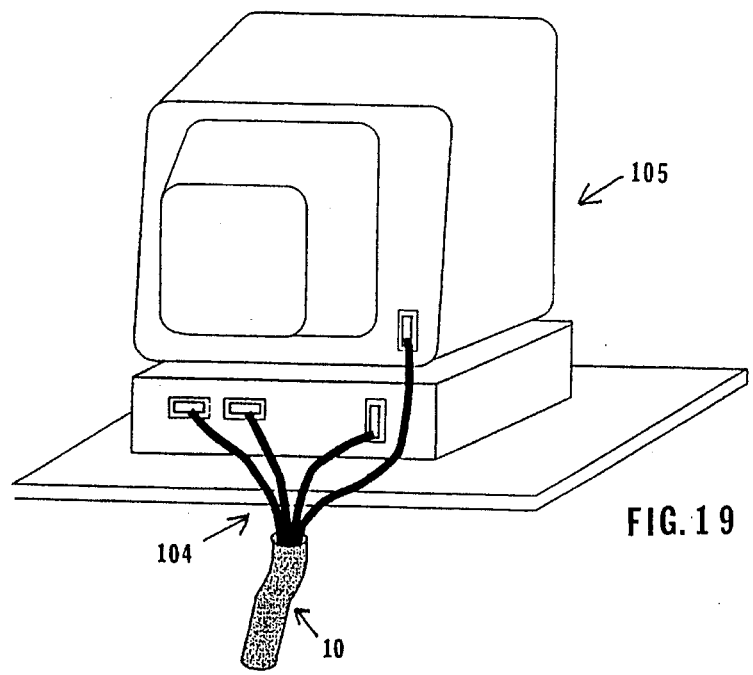
FIG. 19 is a plan view of the organizer in an operative orientation securing and retaining the cables of a single PC.

Referring to FIG. 19, in use, the organizer 10 is unzipped and wrapped around a plurality of cables or cords 104 of a PC 105 for example. The organizer 10 is positioned at a point where all of the cables 104 (which extend from various points along the back or interconnect side of the PC 105 and/or other electronic devices) are capable of being brought into close proximity with each other without undue strain on the cables or their connections to the PC 105. The organizer 10 secures the individual cables into a unitary group. The cable group is clean, secure, and organized. This is aesthetically beneficial, safe and permits improved access by users to the back of the PC 105 and the various interconnections between the cables 104 and peripheral devices such as monitors, printers, communication devices, pointing devices and the like. The organizer 10 may remain in place for an extended period of time and is easily removed to add or remove components to the PC 105 or for moving. During moving, the organizer 10 may also be kept in place to secure the cables 104.

An alternative embodiment of the organizer 28 is shown in FIG. 8. The organizer 28 has a cylindrical, elongated configuration in an operative orientation with proximal and distal ends 29 and 30. The organizer 28 includes a body 31, a zipper 32 and an ornamental head 33 disposed on the proximal end 29 of the body 31. The head 33 is attached around the body 31, a predetermined distance from the opening at the proximal end 29 by a hook and loop type fastening strap 36. The head 33 has a mouth opening which provides access to the concealed opening 35. The organizer 28 may be configured in a variety of ornamental designs consistent with the basic teachings of this invention.

Another embodiment of the organizer 42 is shown in FIG. 9. This embodiment 42 includes a body 50 with proximal and distal ends 43 and 44, and first and second longitudinally oriented body edges 45 and 46. The edges each have complementary hook and loop type fastening members 47 and 48 attached thereto, preferably via stitching 49. This hook and loop type fastening system is an alternative to the zipper systems shown earlier.

Yet another embodiment of the organizer 55 is shown in FIG. 10. This embodiment 55 includes a body 63 with proximal and distal ends 56 and 57, and first and second longitudinally extending body edges 58 and 59. Three straps 60 a–c are spaced along the length of the body 63 to join the first and second edges 58 and 59 together to enclose cables. Each strap 60 a–c includes a flexible member 61 sewn to the body 63 and a buckle 62.

Figure 17:
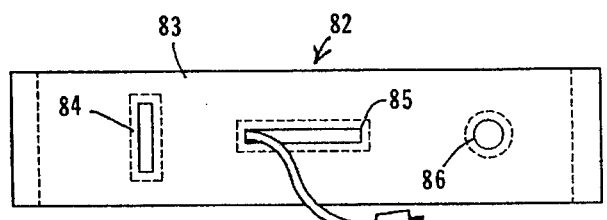
FIG. 17 is a plan view of another embodiment of the organizer.

An additional embodiment of the organizer 68 is shown in FIGS. 11–17. The organizer 68 comprises a flexible, cylindrical (when expanded in an operative orientation) body 69 with open ends and a hollow interior for extension therethrough of cables. Importantly, the body has an aperture 70 for ingress and egress of one or more of the cables 75. A flap or cover 71 may be used to close the aperture 70 when it is not in use. The flap 71 is attached at one end to the body 69 via stitching 72. The opposite end of the flap 71 has a first hoop and loop type pad 74 attached along its interiorly facing edge. A second hook and loop type pad 73 is attached to the body 69 proximate the edge of the aperture 70, aligned for mating with the first hook and loop member 74. A further embodiment of the organizer 82 is shown in FIG. 17. This embodiment of the organizer 82 has a body 83 with various different shapes and sizes of ingress/egress apertures 84, 85 and 86 for passage of cord 87.

Figure 18:
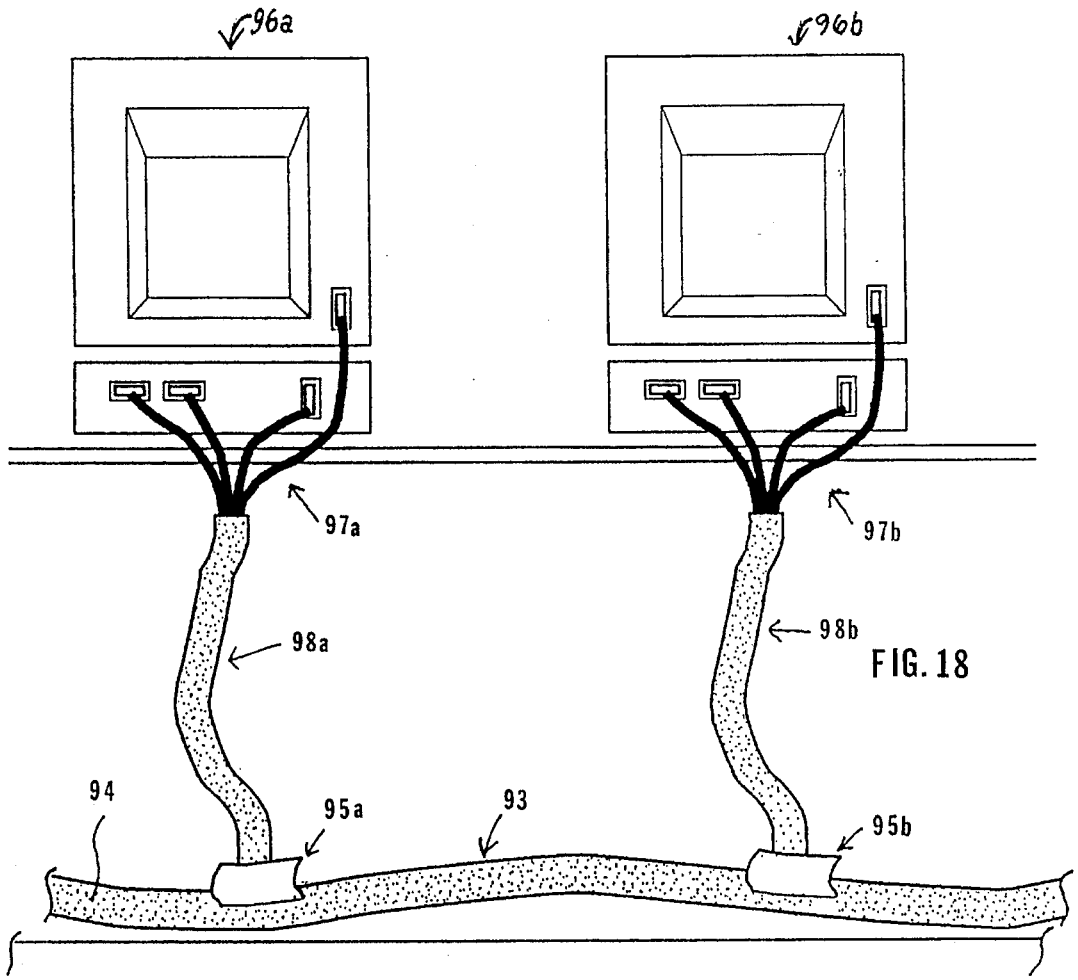
FIG. 18 is a plan view of multiple organizers used to secure the cables of a series of PCs.

Final embodiments of the organizer 93 and 98 are shown in FIG. 18. This combination of organizers 93 and 98 is for use in organizing cabling from a bank of interconnected PCs 96. Organizer 93 is a primary or major unit with a body 94 which is of a relatively large diameter and length. Access ports 95 are disposed at predetermined intervals for linking with a plurality of secondary or minor units 98. Each minor unit 98 encloses the cabling 97 of a single PC 96 from a point near the PC 96 to its entrance into the minor unit 93. This organizer system comprising a major and several minor units 93 and 98 is especially useful in networked systems of PCs such as are typically found in medium to large size businesses, governmental agencies and educational facilities.

Although the invention has been described in the context of an apparatus for organizing PC and computer related interconnect and power cables and wiring, the invention may be used with a variety of electronic and other devices such as TV/VCR systems, stereo systems, medical and lab equipment, kitchen appliances and shop equipment.

As many changes are possible to the embodiments of this invention utilizing the teachings thereof, the descriptions above, and the accompanying drawings should be interpreted in the illustrative and not the limited sense.

The invention claim is:

1. An apparatus for securing a plurality of elongated flexible insulated electrical conductors, comprising:

(a) a body constructed of a single piece of thin, flat, flexible fabric material having a rectangular configuration with first and second reinforced end edges and first and second side edges;

(b) means, disposed along said first and second side edges, to releasibly join said side edges together;

(c) at least one ingress/egress aperture disposed at a predetermined point in said body; and (d) means to close said ingress/egress aperture.

2. An apparatus for securing a plurality of elongated flexible structures, comprising:

(a) a body constructed of a single piece of thin, flat, flexible material having a quadrilateral configuration with first and second end edges and first and second side edges, said body having at least one aperture for extension therethrough of an elongated flexible structure, said body further having a releasable flap coveting said aperture; and (b) means, disposed along said first and second side edges, to releasibly join said side edges together.

3. An apparatus for securing a plurality of elongated flexible structures, comprising:

(a) body constructed of a single piece of thin, flat, flexible LYCRA fabric having a quadrilateral configuration with first and second end edges and first and second side edges;

(b) an ornamental head structure attached to said body; and (c) means, disposed along said first and second side edges, to releasibly join said side edges together.

* * * * *